Patented Dec. 20, 1949

2,491,580

UNITED STATES PATENT OFFICE 2,491,580

ORGANIC ISOCYANATES AND METHOD FOR THEIR PREPARATION

Stearns T. Putnam, Newark, Del., assignor to Hercules Powder Company, Wilmington, Del., a corporation of Delaware No Drawing. Application April 1, 1948, Serial No. 18,505

20 Claims. (Cl. 260—100)

This invention relates to new rosin derivatives and more particularly to novel isocyanates having the same hydrocarbon nucleus as the rosin acids, hydrorosin acids and dehydrorosin acids.

The most well known method of preparing isocyanates involves the reaction of an amine with phosgene and the lack of the requisite amine has usually made the isocyanate unobtainable. Isocyanates are also believed to be formed as intermediates in the reaction of an amide with a hypohalite whereby the amide is degraded to the amine. It is generally accepted that in this hypohalite degradation of amides the isocyanate intermediate reacts with the water present as rapidly as formed with conversion of the isocyanate into a carbamic acid which subsequently breaks down into the amine and carbon dioxide. While most isocyanates are so reactive as to be incapable of isolation as such from the reaction medium, the actual isolation of the isocyanates has in some instances been reported. Nevertheless, it has not been possible to predict even among homologs whether a proposed isocyanate will be sufficiently stable to be capable of isolation from the hypohalite reaction mixture.

Now in accordance with the present invention it has been found that rosinyl, hydrorosinyl and dehydrorosinyl isocyanates may be prepared and isolated in a stable form by reacting an amide of the corresponding rosin acid with a hypohalite of an alkali metal. Thus, it has been found that amides of rosin acids, hydrogenated rosin acids or dehydrogenated rosin acids which differ from one another only in the degree of saturation in the nucleus undergo the hypohalite reaction with rearrangement to form an isocyanate having the same nucleus as the amide.

The following examples illustrate the preparation and properties of these new isocyanates. All parts and percentages are by weight unless otherwise indicated.

Example 1

The acid chloride of dehydrogenated rosin acids was made by adding 69.5 parts phosphorous trichloride to 300 parts pulverized disproportionated rosin and heating at 90°–95° C. for 3 hours with stirring. The amide of the dehydrogenated rosin acids was made by pouring the molten acid chloride prepared above gradually with rapid stirring to 1500 parts 28% ammonium hydroxide cooled to 0° C. The amide of dehydrogenated rosin acids separated as a powder which was removed by filtration and dried. The yield was 281 parts dry powder.

The isocyanate was made from the amide as follows. To a suspension of 27.7 parts dehydrogenated rosin acid amide prepared as above in 200 parts water was added a potassium hypobromite solution prepared by adding 16 parts bromine to 160 parts 25% potassium hydroxide solution. The suspension was stirred with the hypobromite for 2.5 hours during which time the amide became gummy. Three hundred parts hexane was added to dissolve the gummy material. The hexane layer was separated and filtered to remove 2.9 parts dehydrogenated rosin acid amide which was insoluble in hexane. The dehydrorosinyl isocyanate was then recovered by distilling off the hexane. The dehydrorosinyl isocyanate was a viscous oil amounting to 23.2 parts. Its analysis showed 80.60% carbon, 9.16% hydrogen and 4.64% nitrogen which agrees closely with that calculated for $C_{19}H_{29}NCO$.

The dehydrorosinyl isocyanate was converted to the dehydrorosinyl amine by heating 5 parts of the isocyanate with 200 parts 36% hydrochloric acid solution at 90°–95° C. for one hour with vigorous stirring. The dehydrorosinyl amine hydrochloride formed an insoluble crystalline suspension. After cooling and diluting the suspension with 300 parts cold water, the insoluble amine hydrochloride was separated by filtration. It amounted to 4.5 parts.

The amine hydrochloride was converted to the free amine by dissolving it in 50 parts 50% alcohol and adding 10 parts 10% aqueous sodium hydroxide. The amine was separated by extracting the aqueous alcohol solution containing droplets of the amine with hexane. The dehydrorosinyl amine was recovered by distilling off the hexane. The dehydrorosinyl amine amounting to 3 parts was a pale yellow viscous oil which crystallized in part on standing. The amine was readily titrated with standard hydrochloric acid solution and showed a neutral equivalent of 268 (271.5=calculated value for dehydrorosinyl amine $C_{19}H_{27}NH_2$). The amine was also shown by Dumas nitrogen analysis to contain 5.22% nitrogen (5.16% nitrogen=calculated value for $C_{19}H_{27}NH_2$).

Example 2

Dihydroabietamide was made by refluxing 10 parts dihydroabietonitrile with 200 parts ethylene glycol containing 2.3 parts potassium hydroxide dissolved therein. The refluxing was carried out at about 176° C. for 9 hours and the resulting solution was then poured into 2000 parts cold water. The dihydroabietamide separated as a powder which was removed by filtration and was freed of unreacted nitrile by washing with hexane in which the nitrile is soluble and the amide is insoluble. The dried dihydroabietamide amounted to 4.2 parts.

Four parts dihydroabietamide powder was added to 4 parts sodium hypochlorite solution containing 10% available chlorine prepared by passing chlorine into a well-cooled 10% solution of sodium hydroxide. The mixture was stirred thoroughly for 2 hours, 10 parts benzene was added and stirring was continued for one hour longer. The benzene layer was separated, diluted with 10 parts hexane, washed with water and filtered. The benzene and hexane were removed by distillation and the dihydrorosinyl isocyanate was recovered as the residue in the form of a light yellow oil.

*Example 3*

Abietamide was made from rosin nitrile which is chiefly abietonitrile by the process of Example 2. The abietamide was then treated with the sodium hypochlorite solution formed by passing approximately the theoretical amount of chlorine into a 10% solution of sodium hydroxide and subsequently mixing with an equal weight of a 5% sodium carbonate solution. In carrying out this process 300 parts abietamide was treated with a mixture of 1600 parts of the sodium hypochlorite-sodium carbonate mixture at 25° C. The product was kept fluid by the addition of 100 parts hexane during the reaction and the reaction of the abietamide was brought substantially to completion by very rapid agitation which dispersed the hexane and abietamide thoroughly during the reaction.

The isocyanates of this invention are made by treating amides of rosin acids, hydrogenated rosin acids and dehydrogenated rosin acids with a hypohalite in accordance with this invention. The isocyanates produced are cycloalkyl isocyanates where the cycloalkyl radical is a $C_{19}$ radical. The term "rosinyl" has been applied to the 19 carbon alkylated hydrophenanthrene nucleous which occurs in the rosin acids and the partially hydrogenated rosin acids. "Rosinyl" is thus well known as the generic name of the $C_{19}H_{29}$ and $C_{19}H_{31}$ radicals which occur in abietic acide, levopimaric acid, neoabietic acid, dextropimaric acid and like acids whose general formula is $C_{19}H_{29}COOH$, and dihydroabietic acid, dihydrolevopimaric acid, dihydrodextropimaric acid and like acids whose general formula is $C_{19}H_{31}COOH$. The term "rosinyl" is likewise here applied broadly to the $C_{19}H_{29}$ and the $C_{19}H_{31}$ radicals which occur in the rosin acids and the dihydrorosin acids. The term "hydrorosinyl" refers to the $C_{19}H_{33}$ radical having the ring structure of the fully hydrogenated rosin acids, and the term "dehydrorosinyl" refers to the $C_{19}H_{27}$ radical having the ring structure of dehydroabietic acid. The terms norabietyl, nordihydroabietyl, nortetrahydroabietyl, and nordehydroabietyl are the specific names applied to those radicals which have the ring structure of abietic acid, dihydroabietic acid, tetrahydroabietic acid and dehydroabietic acid respectively wherein the point of linkage is carbon number one.

The rosin acid amide used in the preparation of the isocyanate will be selected according to the particular isocyanate desired. Since there is no change in the nucleus due to the reaction of the amide with the hypohalite, the isocyanate will have the same nuclear configuration and composition as the rosin acid amide treated. Thus, abietamide will yield norabietyl isocyanate, and dehydroabietamide will yield nordehydroabietyl isocyanate.

The rosin acid amides may be prepared in any suitable manner such as by partial hydrolysis of the nitrile or by conversion of a resin acid to an acid chloride and subsequently reacting the acid chloride with ammonia. The nitriles which may be partially hydrolyzed to the amide may be prepared by passing gaseous ammonia into molten rosin or hydrogenated rosin or dehydrogenated rosin and vaporizing the water as fast as it is formed in order to remove the water from the reaction mixture. The nuclear configurations of the amide will be the same as that of the nitrile from which it is made.

The hypohalite used for the reaction with the amide is suitably a hypochlorite or a hypobromite and may be prepared by adding chlorine or bromine to an aqueous solution of metal hydroxide, carbonate, or bicarbonate or in any other suitable manner. The most satisfactory metal ion is an alkali metal, preferably sodium, and the preferred hypohalite is a hypochlorite. The hypohalite solution may be neutral, or alkaline and is preferably free of uncombined halogen. The hypohalite solution is preferably alkaline due to an excess of metal hydroxide or carbonate under which conditions there will ordinarily be no excess uncombined halogen. The hypohalite solution is generally used in the theoretical amount required for reaction with the amide, i. e., a mole per mole ratio, but a small excess of hypohalite may be used if desired. The concentration of the hypohalite solution is not important but a concentration within the range of about 10% to about 50% metal hypohalite in aqueous solution is preferred. The metal halide salt formed in the preparation of the hypohalite may also be present.

The temperature for the reaction of the hypohalite with the amide may be any temperature within the range of about 0° C. and about 50° C. The preferred temperature is within the range of about 20° C. and about 30° C.

The preferred rosin acid amide for conversion into the isocyanate in accordance with this invention is the dehydroabietamide because it is the most economical to produce and gives the best overall yields in starting from the rosin acid. In place of dehydroabietamide the acid amide of dehydrogenated or disproportionated rosin may be used equally well, in which case the yield will be diminished only to the extent of impurities which may be in the dehydrogenated rosin amide and which would be absent in a purified product.

The isocyanates of this invention are water-insoluble and may be separated from the aqueous solution by filtration or by extraction with a solvent immiscible with water. The isocyanate may be separated from unreacted amide by means of the difference in solubility of the two materials. The isocyanate being more soluble in hydrocarbon solvents than the amide makes the use of hydrocarbon solvents advantageous. Solvents which may be used for the separation include ethylene chloride, benzene, toluene, hexane, petroleum ether, gasoline, ether, methylene chloride and the like. The solvent is suitably removed from the isocyanate by distillation. Reactive solvents such as alcohols are generally avoided.

The isocyanates of this invention may be converted into the corresponding amines by hydrolysis of the isocyanate as has been shown in the examples. The amine produced has the same nuclear structure as the isocyanate from which it is produced. Thus, a rosinyl isocyanate will be hydrolyzed to a rosinyl amine, a hydrorosinyl isocyanate will be hydrolyzed to a hydrorosinyl amine and a dehydrorosinyl isocyanate will be hydrolyzed to a dehydrorosinyl amine. The hydrolysis of the isocyanate is carried out in the presence of aqueous hydrohalide preferably in the presence of aqueous hydrochloric acid. The amine is isolated in the form of the hydrohalide salt and the free amine may be recovered by treatment of the salt with a metal base which will combine with the hydrogen halide and liberate the amine. The hydrolysis of the isocyanate may be carried out by heating the isocyanate with the aqueous hydrohalide at any temperature within the range of about 50° and about 150° C. The preferred hydrolysis temperature is within the range of about 90° C. and about 110° C. The hydrogen halide solution used for the hydrolysis should contain sufficient hydrogen halide to form the amine salt. The amount of hydrogen halide in the solution should be within the range of about 20% to about 40%. The preferred hydrogen halide solution is hydrochloric acid. If desired, the hydrolysis may be carried out under pressure. The amine hydrohalides are insoluble in cold water and are readily formed in crystalline state by cooling the solution to room temperature or below if desired. The amine hydrohalides may be separated from the cooled hydrolysate by filtration.

The rosinyl, hydrorosinyl and dehydrorosinyl isocyanates produced in accordance with this invention are colorless viscous liquids having a boiling point of about 160° C. at 1 mm. pressure. They are surprisingly stable in cold water but are reactive with alcohols and amines. With alcohols they form valuable urethanes. With cellulose they react with the hydroxyl groups to form a water repellent coating. With amines they form ureas and with proteins such as wool they also form water repellent coatings. The low reactivity of these isocyanates toward water is an advantage not possessed by most isocyanates and permits reactions with alcohols and amines to be carried out in the presence of water. The isocyanates of this invention find utility as waterproofing agents, as components of adhesives, as materials for promoting adhesion of rubber, paint asphalt and the like to various materials, as modifiers of ester gums and varnish resins, and as modifiers for synthetic polymers of the cellulose derivative type, the protein type, and the nylon type.

The isocyanates of this invention also find utility as chemical intermediates for the formation of amines, ureas, urethanes and the like. The rosinyl amines, hydrorosinyl amines and dehydrorosinyl amines are also useful as flotation agents, as emulsifying and wetting agents, as chemical intermediates, and as fungicides, germicides, and bactericides.

What I claim and desire to protect by Letters Patent is:

1. The process of preparing an isocyanate selected from the group consisting of rosinyl isocyanates, hydrorosinyl isocyanates, and dehydrorosinyl isocyanates which comprises reacting an amide selected from the group consisting of a rosin acid amide, a hydrogenated rosin acid amide and a dehydrogenated rosin acid amide with a hypohalite salt.

2. The process of preparing a rosinyl isocyanate which comprises reacting a rosin acid amide with a hypohalite salt.

3. The process of preparing a hydrorosinyl isocyanate which comprises reacting a hydrogenated rosin acid amide with a hypohalite salt.

4. The process of preparing a dehydrorosinyl isocyanate which comprises reacting a dehydrogenated rosin acid amide with a hypohalite salt.

5. The process of preparing a rosinyl isocyanate which comprises reacting a rosin acid amide with a hypohalite of an alkali metal.

6. The process of preparing a rosinyl isocyanate which comprises reacting a rosin acid amide with a hypochlorite of an alkali metal.

7. The process of preparing a rosinyl isocyanate which comprises reacting a rosin acid amide with sodium hypochlorite.

8. The process of preparing a hydrorosinyl isocyanate which comprises reacting a hydrogenated rosin acid amide with a hypohalite of an alkali metal.

9. The process of preparing a hydrorosinyl isocyanate which comprises reacting a hydrogenated rosin acid amide with a hypochlorite of an alkali metal.

10. The process of preparing a hydrorosinyl isocyanate which comprises reacting a hydrogenated rosin acid amide with sodium hypochlorite.

11. The process of preparing a dehydrorosinyl isocyanate which comprises reacting a dehydrogenated rosin acid amide with a hypohalite of an alkali metal.

12. The process of preparing a dehydrorosinyl isocyanate which comprises reacting a dehydrogenated rosin acid amide with a hypochlorite of an alkali metal.

13. The process of preparing a dehydrorosinyl isocyanate which comprises reacting a dehydrogenated rosin acid amide with sodium hypochlorite.

14. As a new composition of matter an isocyanate selected from the group consisting of rosinyl isocyanate, hydrorosinyl isocyanate and dehydrorosinyl isocyanate.

15. As a new composition of matter rosinyl isocyanate.

16. As a new composition of matter hydrorosinyl isocyanate.

17. As a new composition of matter dehydrorosinyl isocyanate.

18. As a new composition of matter norabietyl isocyanate.

19. As a new composition of matter nordehydroabietyl isocyanate.

20. As a new composition of matter nortetrahydroabietyl isocyanate.

STEARNS T. PUTNAM.

REFERENCES CITED

The following references are of record in the file of this patent:

UNITED STATES PATENTS

| Number | Name | Date |
|---|---|---|
| 2,201,237 | Littmann | Aug. 24, 1938 |
| 2,326,501 | Siefkin | Aug. 10, 1943 |

OTHER REFERENCES

Chemical Abstracts, vol. 14, page 2474, citing Rinkes, Rec. trav. chem., 30, 200–207 (1920).